United States Patent
Krinkel

(10) Patent No.: US 9,817,379 B2
(45) Date of Patent: Nov. 14, 2017

(54) MUSICAL ENERGY USE DISPLAY

(71) Applicant: David Krinkel, Berkeley, CA (US)

(72) Inventor: David Krinkel, Berkeley, CA (US)

( * ) Notice: Subject to any disclaimer, the term of this patent is extended or adjusted under 35 U.S.C. 154(b) by 0 days.

(21) Appl. No.: 14/789,960

(22) Filed: Jul. 1, 2015

(65) Prior Publication Data

US 2016/0005276 A1   Jan. 7, 2016

Related U.S. Application Data

(60) Provisional application No. 62/020,849, filed on Jul. 3, 2014.

(51) Int. Cl.
| | | |
|---|---|---|
| G08C 19/00 | (2006.01) | |
| G01R 11/32 | (2006.01) | |
| G01R 7/00 | (2006.01) | |
| G10H 3/18 | (2006.01) | |
| G05B 15/02 | (2006.01) | |

(52) U.S. Cl.
CPC .................................. G05B 15/02 (2013.01)

(58) Field of Classification Search
CPC ........ G08C 15/04; G01R 35/04; G01R 11/30; G01R 21/133; B27K 1/00
USPC ............. 340/870.12; 324/74, 134, 142; 84/1
See application file for complete search history.

(56) References Cited

U.S. PATENT DOCUMENTS

| | | | |
|---|---|---|---|
| 6,694,293 B2 * | 2/2004 | Benyassine et al. ... | G10L 19/18 704/219 |
| 6,953,885 B2 * | 10/2005 | Konishi ................... | G10G 7/02 84/454 |
| 8,195,451 B2 * | 6/2012 | Toguri ..................... | G10L 25/78 381/110 |
| 2003/0179672 A1 * | 9/2003 | Takashima ............. | G11B 19/00 369/53.18 |
| 2005/0096898 A1 * | 5/2005 | Singhal .................. | G10H 1/125 704/205 |
| 2005/0273328 A1 * | 12/2005 | Padhi et al. ............. | G10H 1/40 704/239 |
| 2011/0015797 A1 * | 1/2011 | Gilstrap ................. | G05B 15/02 700/291 |
| 2011/0201911 A1 * | 8/2011 | Johnson ............. | A16B 5/14532 600/365 |
| 2015/0114208 A1 * | 4/2015 | Lapkovsky ............... | G10H 1/40 84/612 |

* cited by examiner

*Primary Examiner* — George Bugg
*Assistant Examiner* — Munear Akki
(74) *Attorney, Agent, or Firm* — Larisa Migachyov

(57) ABSTRACT

A system and method for encouraging an energy user to conserve energy by providing the user with musical feedback describing their energy use as a musical piece. Various musical parameters of the musical piece may be manipulated to describe higher- or lower-than-expected energy use, in order to encourage the user to conserve energy. A visual animation may also be added to the musical piece to illustrate it further.

12 Claims, 1 Drawing Sheet

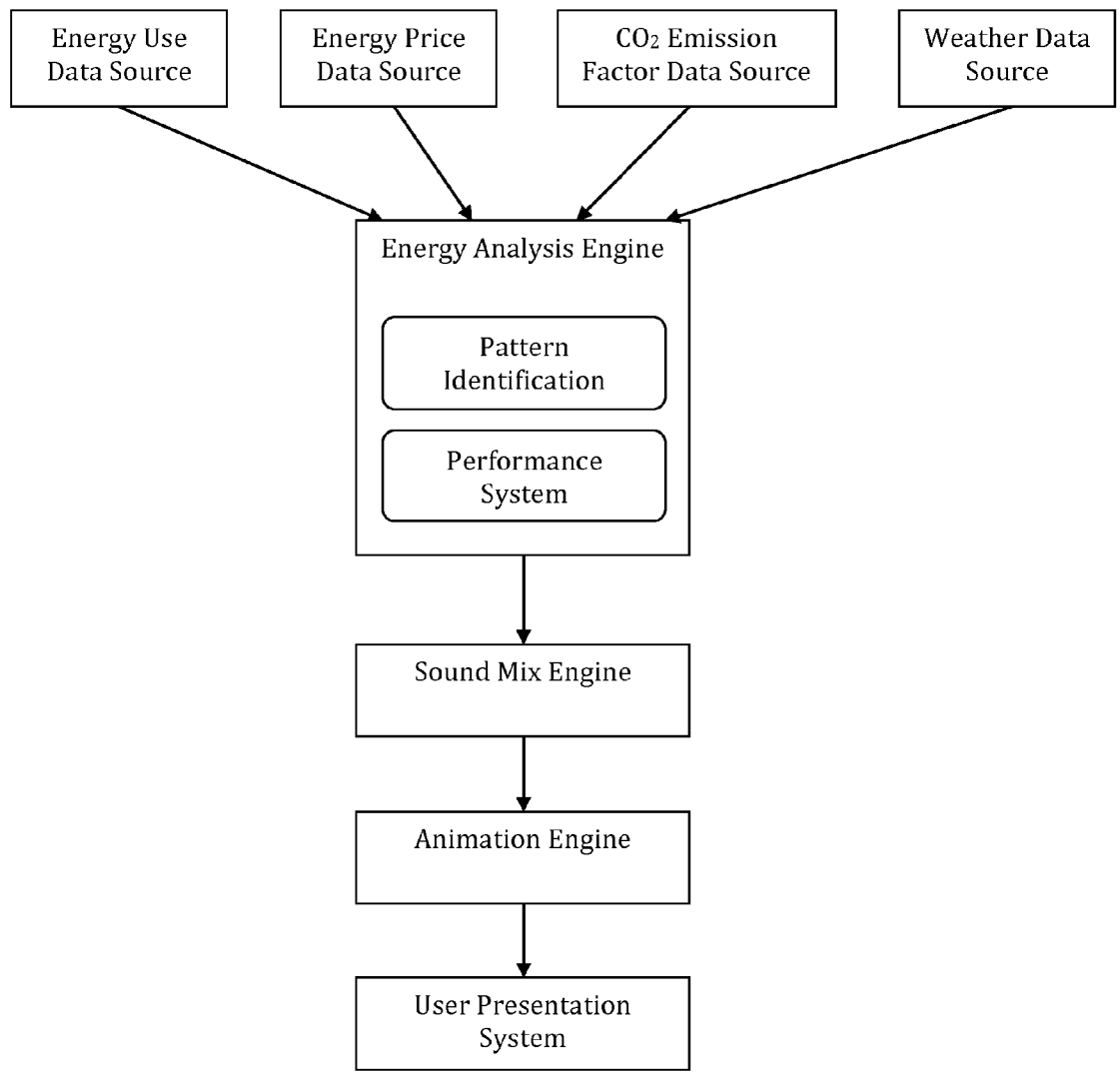

MUSICAL ENERGY USE DISPLAY

CROSS-REFERENCE TO RELATED APPLICATIONS

The present application takes priority from Provisional App. No. 62/020,849, filed Jul. 3, 2015, which is incorporated herein by reference.

BACKGROUND

Field of the Invention

The present invention relates generally to applications designed to reduce energy use associated with buildings, and specifically to a music-based system and method for reducing energy use associated with buildings.

Background

Reducing energy use associated with buildings is an important task, and many utility companies and other organizations are concerned with how to motivate people to reduce their energy use. However, the feedback that is typically provided by to utility customers is boring and dry, and does not engage the user or provide sufficient motivation.

A need exists for a more entertaining and engaging way to provide feedback to a utility customer about their energy use. People react very strongly to music and animation; providing a song based on a user's energy use, or an animated cartoon with a soundtrack based on a user's energy use, could be a fun and engaging way for a user to monitor their energy use.

SUMMARY OF THE INVENTION

An object of the present invention is to provide music-based feedback to a user to describe their energy use.

Another object of the present invention is to provide music-based feedback to a user to motivate the user to reduce their energy use.

For purposes of the present invention, a "user" is a person whose utility use is being measured. The most typical example of a user is a homeowner or a tenant who is a utility company customer. However, business or institutional entities could also be users.

A "performance period" is defined as a recurring time span over which a user's energy use is being measured. This is preferably a weekly period, but could be other periods of time, depending on user needs.

"Energy use" could be the use of electricity, gas, oil, water, or any other service provided by a utility company where the need exists to encourage users to conserve their use of the service.

The present invention comprises a method for encouraging energy conservation, comprising collecting and analyzing energy use data for a first time period, subdivided into a plurality of second time periods, generating a musical audio file depending on the result of the analysis of energy use data for each second time period, combining the musical audio files to generate a piece of music, and presenting the piece of music to the user.

In an embodiment, the piece of music can have a pre-recorded introduction added to it and/or voice narration overlaid on top of it (for example, to explain the musical parameters used to generate the file or to compliment the user for their conservation).

In an embodiment, the analysis of the energy use data comprises determining an expected use range for each second time period and determining whether the user's energy use is within, above, or below the expected use range.

The energy use data can comprise at least one of the following: total energy consumption, average electric power, energy cost, apparent power, apparent energy, reactive power, reactive energy, $CO_2$ emissions associated with energy use.

In an embodiment, the following data may be used to determine an expected use range for each second time period: weather data, any day-of-week patterns in energy use, energy use from always-on equipment, long-term trends in energy use, historical energy use data, potential savings in energy use.

In an embodiment, the step of analyzing the energy use can also comprise identifying possible causes of energy consumption above or below the expected use range, identifying energy shut downs, identifying any new potential savings opportunities, or calculating progress towards or away from a current savings target.

The step of generating a musical audio file preferably comprises storing a plurality of musical passages in a database, and storing a plurality of individual musical notes in a database, said notes being modifiable in pitch, volume, and duration; indexing at least one musical passage by at least one of the following variables: mood, style, mode, key, relative amount of consonance, relative amount of dissonance; and creating a sound template that comprises rules for selecting musical passages and musical notes depending on the user's energy use; the sound template is then used to generate a musical audio file.

In an embodiment, at least one musical variable of at least one musical passage and/or musical note is modified depending on the analysis of the user's energy use. The musical variables may be timbre, pitch, instrumentation, or speed, or any combination of the above.

In an embodiment, the selected musical passages may be modified so that they form a coherent whole when joined into a piece of music.

In an embodiment, the user is given an opportunity to select a musical style they like and a musical style they dislike; these preferences are then used to select musical passages depending on the user's energy use.

In an embodiment, sound effects may be added to the musical audio file depending on the user's energy use.

A visual animation may be synchronized to the musical audio files and added to the piece of music, and presented to the user together with the piece of music.

DETAILED DESCRIPTION OF THE PREFERRED EMBODIMENT

In its preferred embodiment, the system of the present invention comprises a data source, an energy analysis engine, a sound mix engine, (optionally) an animation engine, and a user device with an app installed on it, said app providing a connection to the energy analysis engine, sound mix engine, and animation engine (if used), and displaying the information to the user as a song or a video.

The basic principle of the preferred embodiment of the present invention is as follows. A user's energy use over the performance period is measured and compared to a desired pattern of energy use. The periods where a user exceeded the desired amount of energy use, the periods where a user stayed within a desired range of energy use, and the periods where a user fell below a desired range of energy use, are noted. Then, a musical piece is created based on the user's pattern of energy use as compared to a desired pattern. The musical piece could be accompanied by spoken-word narration to indicate the meaning of each musical variable, or to congratulate the user. The musical piece is then displayed for the user at the conclusion of each performance period.

FIG. 1 shows the operation of the preferred embodiment of the present invention. The energy analysis engine receives data from various data sources, such as (as shown in the FIGURE) the user's energy use, energy prices, $CO_2$ emission factors, and weather. Other data sources may also be used, such as water usage, natural gas usage, water availability, drought conditions, and so on.

The data collected from the energy use data source preferably comprises at least the following information:
  a. Energy consumption or average power over a time period. For example, electricity consumption is usually measured in units of kiloWatt-hours (kWh) or Watt-hours (Wh). Electric power is usually measured in units of kiloWatt (kW) or Watt (W).
  b. The time period for each consumption or average power value. This period must be no longer than one hour. Typical time periods are 5, 15, 30, or 60 minutes. The time period is usually identified by a time stamp (date, hour, minute, seconds) for the start, end, or both of the period.

The data collected from data sources may also comprise the following information:
  a. Price or cost for the energy consumption or average power over a time period. For example, the electricity consumption price might be US$/kWh, or the cost might be US$.
  b. Apparent power, apparent energy, reactive power, and reactive energy.

Most energy consumption requires fossil fuel combustion, which releases carbon dioxide into the atmosphere. When the consumed energy is a fossil fuel (e.g. natural gas for water or space heating in the home) it is straightforward to calculate the resulting $CO_2$ emissions, because the $CO_2$ content doesn't vary much for the fossil fuel. But when the consumed energy is electricity, the resulting $CO_2$ emissions depend upon the source energy for electricity generation. There is a huge variance in this, from near zero emissions for hydro, wind, and solar generation, to high emissions for coal generation, and most utilities have a mix of generation sources.

In an embodiment, the energy analysis engine can retrieve or receive electricity $CO_2$ emission factors from an external source. Examples of such sources include:
  a. United States Environmental Protection Agency (US EPA). US EPA maintains the Emissions & Generation Resource Integrated Database (eGRID), which includes annual emission factors for the U.S. by region.
  b. International Energy Agency (IEA). IEA maintains a database of historical emission factors for many countries.

The energy analysis engine preferably requires the following information from the $CO_2$ emission factor data source:
  a. Average equivalent $CO_2$ emission (mass) per unit of energy consumption.
  b. Effective dates for each factor.

In an embodiment, the energy analysis engine also collects weather data at the user's location. Preferably, the weather data comprises the average daily outdoor dry bulb temperature for a site near the user's location. The energy analysis engine may receive this data from an external source, such as the United States National Oceanic and Atmospheric Administration's National Climatic Data Center (NCDC), which maintains a database of weather data for thousands of sites around the world.

The energy analysis engine preferably collects ongoing, current data for all the variables described above, as well as historical data to establish a user's typical use patterns and potential energy savings opportunities. The historical data may be collected for any period of time of any duration, as long as the amount of data is sufficient to establish a pattern.

Once the energy analysis engine receives the data from the various data sources, it preferably applies at least one algorithm to the data to process it. In the preferred embodiment, two systems are used to process the data. The pattern identification system uses the historical data to determine the user's dominant energy use patterns and potential energy savings opportunities. The performance system uses the data for each current performance period to compare it to historical patterns, and identifies newly emerging potential energy savings opportunities.

The pattern identification system preferably does the following things. It collects historical data from the sources described earlier; typically, the timespan is about a year preceding the current date. Then, it applies at least one, and preferably all, of the following algorithms to the data:
  a. Data validation—some of the data provided by the external sources may have gaps or bad values. For example, the energy use data may have gaps due to meter failures, or unrealistic consumption or power values. The app employs industry-standard validation tests to identify such occurrences, and ensure that these do not adversely influence the analysis results.
  b. Determine weather sensitivity—energy use is compared to local warming and cooling trends to determine if weather has a significant impact on energy use, typically from heating or cooling equipment. The analysis quantifies the strength of the impact (if any), the balance point outdoor temperature above or below which cooling or heating is required, and the hours in a day whose energy use follows the weather trends.
  c. Identify day-of-week patterns—many buildings have distinctive energy use patterns which apply to different days of the week. For example, a house may have one pattern for weekdays, and a different pattern for weekends. Patterns are identified by relative daily energy use (e.g. Saturdays and Sundays usually have higher total energy use than Mondays through Fridays), hour-to-hour changes in energy use (i.e. at what time of day does the energy use rise or fall), and at what times of day the daily maximum and minimum use occur.
  d. Determine energy use from equipment which is always on—sometimes called "base use" or "24×7 use", almost all buildings have equipment or appliances which are always consuming energy, even when not in use. This is one of the fastest rising components of energy use in residential and non-residential buildings. The analysis identifies the power level from this equipment.
  e. Identify long-term trends—energy consumption can rise or fall over multiple week periods due to factors not quantified by the external data sources. For example, electricity use in an elementary school might drop in summer when school is not in session. The analysis quantifies these trends.
  f. Identify potential savings opportunities—some of the preceding pattern identification system tasks reveal opportunities to reduce energy consumption. For example, the weather sensitivity analysis may indicate that heating or cooling thermostat setpoints are too high or low, or that night setback is not occurring. The day-of-week patterns may show that high energy use extends into hours when the building is not occupied, therefore equipment can be shut off earlier. The analysis quantifies the potential savings in energy consumption and associated cost and $CO_2$ emissions from operational and other changes.

g. Determine savings target—the key objective of the system of the present invention is to encourage the user to reduce energy consumption and associated costs and $CO_2$ emissions. Toward that end, the analysis will calculate a target reduction in energy consumption as a goal for the user. The reduction target can also be expressed as a cost and/or $CO_2$ savings goal. The target will be based upon the user's historical energy use patterns and consumption. The initial target should be easily reachable, and subsequent targets should be increasingly more difficult to reach.

These algorithms are preferably applied immediately after the historical data is received. The system of the present invention may collect historical data at any point in time, and may do so at multiple times to re-establish a baseline and re-establish new savings targets.

The performance system receives current data from the data sources and analyzes ongoing use. In the preferred embodiment, the performance period is one week; however, a longer or shorter period may be used. When a full performance period's worth of data has been received, the performance system applies at least one, and preferably all, of the following algorithms to the data:

a. Determine the expected use range—using the information from the pattern identification system in combination with current external source data, minimum and maximum "expected" energy consumption values are calculated for a time period in the current week. Usually this time period is hourly or smaller. For example, the minimum and maximum expected energy consumption is calculated for the hour ending Tuesday at noon in the current week. These consumption values make use of the daily outdoor temperature for that Tuesday, the day-of-week consumption patterns for the user, the "24×7" power for the user, and any long-term trends which might apply to the current week.

b. Estimate energy consumption components—the energy consumption from the energy use data source can be subdivided into components, including "24×7", weather-driven, and long-term trends.

c. Identify periods when actual consumption is above or below the expected range—identify the start and end times when actual consumption is greater than the upper limit of the expected use range or lower than its lower limit. For example, actual consumption exceeded the expected use range for 4 hours beginning at 2 am Thursday of the current week. The analysis also quantifies the energy consumption for each occurrence which exceeded or was less than the expected use range.

d. Identify possible causes of consumption above or below the expected range—it is sometimes, though not always, possible to detect a pattern in an occurrence of consumption outside the expected use range. For example, if the expected use range drops at 10 pm on a Monday night, this is because the pattern identification system determined that this is "typical" behavior for a Monday night. But if the actual consumption did not drop, but remained at an elevated level for several more hours, it can be implied that something (perhaps lighting) was left on when it is normally turned off.

e. Identify patterns in occurrences of consumption above or below the expected range—the analysis identifies recurring patterns of consumption outside the expected range, by time of day, day of week, and possible cause. For example, if the occurrence described in the preceding bullet happened again at about the same time on Tuesday and Wednesday nights, it may indicate a change in behavior of which the user is unaware.

f. Identify shut downs—energy consumption may drop to very low levels for extended periods of time. For example, the user may be on vacation, or the facility may be undergoing maintenance. It is useful to identify these periods because the lower than expected energy consumption may not be counted toward the user's savings target.

g. Identify new potential savings opportunities—new opportunities to reduce energy consumption may be revealed in the current week's data. For example, the "24×7" power may have risen, indicating that new equipment is now operating in the building. The analysis quantifies these potential savings in energy consumption and associated costs and $CO_2$ emissions from operational and other changes.

h. Update progress towards or away from the current savings target—when actual energy consumption is less than the expected use range, this is counted as savings towards the current savings target. Conversely, actual energy consumption which is greater than the expected use range is counted against the savings target. So the overall result for the performance period is the difference between these two quantities—net savings toward the target when "under consumption" is greater than "over consumption". The analysis updates the progress towards the goal based on these two quantities.

When the data is collected and processed, it is then fed into the sound mix engine. The sound mix engine generates an audio file—preferably a musical piece—based on the energy use data. In the preferred embodiment, the sound mix engine selects, combines, and modifies pre-recorded sounds to generate an audio file. The pre-recorded sounds are stored in a database, and preferably fall into three categories:

a. Musical passages—multiple instruments, vocals, and effects all recorded together. For example, a musical passage may be a recording of a full symphony playing a section of a well-known composition. Musical passages are not intended to be modified by pitch or tempo, but instead are inserted into the audio file at times, volume, and for durations determined by the sound mix engine algorithms and the template logic (this is described below).

b. Individual notes—a single instrument, vocal, or sound effect which can be inserted into the audio file at different pitches, volume, and duration determined by the sound mix engine algorithms and the template logic (this is described below).

c. Spoken word narration—recorded phrases which are inserted into the audio file to explain something to the user (e.g. "when you hear the bell, your energy use is less than expected"), congratulate the user (e.g. "you reached your savings goal, good job!"), and otherwise keep the user engaged with the app. Spoken word narration is usually not modified in any way, it is simply inserted into the audio file based on the template logic.

In the preferred embodiment, an audio file is generated for each performance period. The sound mix engine synchronizes the starting and ending times of sounds to the time stamps of the energy use data, using a predetermined timing factor. For example, if the performance period is one week, and the timing factor is 1 hour of the performance period equals 1 second of sound, then the duration of the sound is 168 seconds. Usually a short introduction is added to the beginning of the audio, and a summary is added to the end.

A variety of methods are used to select, combine, and modify sounds for a performance period. The methods and sounds are organized as "sound templates". A sound template is a database construct that provides the rules used to determine which pre-recorded sounds are to be played at what time in the audio file, and how they might be modified in pitch, volume, tone, speed, or other audio changes. Such a sound template may be based on a specific song, but does not have to be.

In the preferred embodiment, the sound template assigns energy performance "cues" to each pre-recorded sound. The cues specify the conditions under which the sound is played. For example, a celebratory trumpet fanfare might be played whenever hourly energy use is less than expected. The cues can be simple (as in the preceding example) or quite complex. A sound might be played only during hours when energy use is more than expected, but only on days where overall energy use is less than expected.

Energy performance cues not only determine whether a sound is played or not, but can change a sound's volume, pitch, tone, compression, or other audio effects.

A different sound template may be used for each performance period to provide a different "musical experience" for the user. The methods used in a sound template include:
  a. Energy consumption above, below, or within the expected use range—perhaps the most important information resulting from the energy analysis engine is whether energy consumption is within the expected range, or above or below it. This drives the user toward or away from their savings goal. So this is usually an important determinant of the sound. It can be used at different time periods—hourly, daily, weekly, etc. For example, an upbeat musical passage might be selected for days when the daily consumption is less than expected, and an ominous passage selected for "over expected" days. Specific notes and instruments might be selected for under or over expected hours. For example, a bell sound may be used for hours when energy consumption was less than expected, and a whistle sound for hours when energy consumption was more than expected. In other embodiments, consonant chords may be used for hours when energy consumption was less than expected, and dissonant chords may be use for hours when energy consumption was more than expected, or other musical variables may be used.
  b. Component energy consumption—as described earlier, the energy analysis engine subdivides energy consumption into components, such as 24×7, weather-driven, and long-term trend. Different sounds can be assigned to these components. For example, a musical passage featuring wind instruments might be assigned to the weather-driven component, so it would be heard on days which are cold or warm enough to increase energy consumption. The pitch of individual notes can be linked to the energy consumption value of a component, rising when the component consumption gets larger. Volume can also be linked to component consumption.
  c. Savings target status—this is primarily used for selecting spoken word narration. The narration is most often inserted in the introduction or summary sections. For example, if at the end of the current performance period the user is near their savings target, encouragement might be offered in the summary, such as "Next week might be the week! Keep saving!"

The sound template is preferably divided into tracks, analogous to tracks used in music recording. A sound template track may be assigned musical passages, narration segments, or sound effects.

The rules of the sound template also determine how the sound mix engine calculates the "synchronization benchmarks" for an audio file—i.e. the precise times when each pre-recorded sound is to be played. Some synchronization benchmarks may be:
  a. Start of introductory music;
  b. Start of introductory narration (for example "Let's see if you saved some energy this week");
  c. Start of current status towards savings goal, showing user their cumulative energy savings at the beginning of the performance period;
  d. Start of performance period audio and animation, which shows the user when they were within, under, or over the expected energy use range;
  e. Start of audio for performance period results, which shows total use for the period under or over expected use;
  f. Start of narration updating the user's savings status with the results from the current performance period;
  g. Start of sign off audio;
  h. Start of sign off narration (for example "That was a great week, let's see if you can do it again next time";
  i. End of audio.

Some of the benchmark times are fixed; for example, the pre-recorded introductory music always begins at a fixed time. Some are calculated by adding a fixed pause after the end of the music for the preceding benchmark. For example, a one-second pause may be desired between the end of some music and the beginning of narration. Some are energy performance dependent; for example, if the user reaches their energy savings goal during the current performance period, the start time for a benchmark may be delayed in order to play celebratory music.

The sound template then creates an audio instruction file that may be used by a software synthesizer to generate the final musical audio. This is preferably MIDI, but other formats may also be used. The MIDI file is preferably created as follows:
  a. Loop through the tracks in the sound template; create the MIDI track header for the current track, which includes overall track duration.
  b. Select the pre-recorded sounds to be played based on the template's energy performance cues. For example, if the energy use for an hour is within the expected use range, the sound mix engine will select the pre-recorded sound with this cue assigned to it.
  c. Calculate the start times and duration of each sound, based upon the synchronization benchmarks.
  d. Modify the volume, pitch, tone, and other audio effects as specified by the energy performance cues.
  e. Store the results in a database table in the form of MIDI instructions.

The MIDI instructions are then retrieved from the database and stored as a MIDI file.

After the MIDI file is generated, it is inputted into a software synthesizer to generate an audio file. The audio file may be any format; the most common ones are MP3 and WAV, but any other format may be used.

The audio files generated by the sound mix engine are used in two ways:

a. Sound template description—music, spoken word narration, and sound effects which describe how the current sound template handles different aspects of energy use patterns. For example, one template might use a bell sound for hours when energy consumption is less than expected, and a whistle sound for hours when consumption is more than expected. The sound template description explains this to the user through the use of generic energy use examples. So the sound template description audio is the same for all users and performance periods.

b. Performance audio—music, spoken word narration, and sound effects which are assembled for a specific user and performance period. So in the example just cited, the bell sound would only occur during hours in the performance period when the user's actual energy consumption is less than their expected consumption.

The performance audio is preferably presented to the user every performance period by means of a mobile phone app, a website, or any other method of presenting information (the user presentation system). In an embodiment, the performance audio can be emailed to the user at the end of each performance period. In another embodiment, the performance audio can be automatically downloaded to a user's iTunes account or other music players. In an embodiment, an introduction may be added to the performance audio, explaining the sound template for the performance period (if it is different), and showing examples of how each performance period's template illustrates higher or lower than expected energy consumption, 24×7 power, weather-driven consumption, and so on. The introduction may also explain the sound template for the subsequent performance period, giving the user an incentive to "earn" particular sounds or musical fragments. For example, the introduction may tell the user that if they maintain a lower than expected energy consumption for an entire day, they can "unlock" an instrument or a sound effect to be added to the week's song.

The user may be able to select a particular musical style for the songs they receive. Some people may prefer to get a classical piece every week; some people may prefer to get a rock song. In an embodiment, the user may be able to set their preferred musical style. In another embodiment, the user may be able to set their least-favorite musical style as well, and have musical fragments from that style used to indicate higher-than-expected energy consumption. For example, a user may like classical music but dislike rock. If the user does well all week, they will get a classical piece; if they do badly at any given time during the week, rock fragments will be interspersed.

The user will thus be able to directly hear their energy use patterns and their success or failure at conserving energy. The entertainment factor of each week's template change will keep the user motivated to improve their energy conservation.

In an embodiment, visual animations are also added to the performance audio. The visual animations are produced by an animation engine, which creates a sequence of animated images synchronized to the performance audio that illustrates the information contained in the performance audio. For example, it may illustrate the following information:

a. The state of the user's progress toward the savings goal at the beginning and end of the current performance period.

b. Actual energy consumption and expected use range during the performance period. The animation highlights time periods when consumption is greater or less than expected.

c. Component energy consumption—24×7, weather-driven, and long-term trends.

d. Unusual conditions or patterns—the animation can highlight unusual events during the performance period, such as very hot or cold weather which increases energy consumption, days when the 24×7 power is unusually high or low, or recurring instances of higher than expected consumption.

In this embodiment, the animation engine combines the performance audio file with the animation videos in a single electronic video file that is supplied to the user as described above.

The user presentation system may provide other information to the user in addition to the performance audio or video. It may also include:

a. Introductory video which explains the sound template for the performance period. For example, if the performance periods are weekly, then each week the introductory video will explain and show examples of how each week's template illustrates higher or lower than expected energy consumption, 24×7 power, weather-driven consumption, etc.

b. Performance period video which shows the user's energy consumption patterns during the performance period, and progress towards or away from the savings goal.

c. Access to past performance period videos.

d. Information about energy savings opportunities revealed in the current performance period.

e. Information about energy savings opportunities based on the pattern identification system analysis.

All of this information may be accessed via a smartphone app, tablet app, website, or computer. Other means of accessing this information may also be available, as long as the means can display audio or video.

Exemplary embodiments have been described above. It will, however, be clear to a person of reasonable skill that the invention encompasses other embodiments, which also fall into the scope of the present invention, and that the invention is solely defined by the appended claims.

The invention claimed is:

1. A method for encouraging energy conservation, comprising:

collecting by an energy analysis engine energy use data for a user over a first time period, said first time period subdivided into a plurality of second time periods;

analyzing by an energy analysis engine the energy use data for the user for each second time period to generate a result;

generating by a sound mix engine a musical audio file for each second time period, wherein at least one musical parameter depends on the result of the analysis of energy use data;

combining by a sound mix engine the musical audio files for each second time period to generate a piece of music;

adding a pre-recorded introduction to the piece of music explaining how the piece of music represents the user's energy use;

adding voice narration to the piece of music explaining how the piece of music represents the user's energy use;

transmitting the piece of music to the user.

2. The method of claim 1, wherein the step of analyzing the energy use data comprises:
   determining an expected use range for each second time period;
   determining whether the user's energy use is within the expected use range, above the expected use range, or below the expected use range.

3. The method of claim 1, wherein the energy use data comprises at least one of the following:
   energy consumption;
   average electric power;
   energy cost;
   apparent power;
   apparent energy;
   reactive power;
   reactive energy;
   $CO_2$ emissions.

4. The method of claim 2, wherein the step of determining an expected use range for each second time period comprises at least one of the following steps:
   collecting and analyzing weather data at the user's location;
   collecting and identifying any day-of-week patterns in energy use at the user's location;
   determining any energy use from equipment that is always on at the user's location;
   collecting and identifying any long-term trends in energy use at the user's location;
   collecting and analyzing historical energy use data at the user's location;
   identifying any potential savings in energy use at the user's location.

5. The method of claim 2, wherein the step of analyzing the energy use data further comprises at least one of the following:
   identifying possible causes of energy consumption above or below the expected use range;
   identifying energy shut downs;
   identifying any new potential savings opportunities;
   calculating progress towards or away from a current savings target.

6. The method of claim 1, wherein the step of generating a musical audio file comprises:
   storing a plurality of musical passages in a database;
   storing a plurality of individual notes in a database, said notes being modifiable in pitch, volume, and duration;
   indexing the at least one musical passage by at least one of the following variables:
      mood, style, mode, key, relative amount of consonance, relative amount of dissonance;
   creating a sound template, said sound template comprising:
      at least one rule for selecting at least one musical passage and/or musical note depending on the analysis of the user's energy use;
   using the sound template to generate a musical audio file.

7. The method of claim 6, wherein the sound template further comprises;
   at least one rule for modifying at least one musical variable of the at least one musical passage and/or musical note depending on the analysis of the user's energy use.

8. The method of claim 7, wherein the at least one musical variable is at least one of the following group: timbre, pitch, instrumentation, speed.

9. The method of claim 6, further comprising:
   modifying the musical audio passages for each second time period with respect to at least one musical variable so that they form a coherent whole when joined into a piece of music.

10. The method of claim 6, further comprising:
    determining at least one musical style the user likes;
    determining at least one musical style the user dislikes;
    wherein the at least one rule for selecting a musical passage and/or musical note when a user's energy usage exceeds the expected use range comprises selecting a musical audio passage in a musical style the user dislikes;
    wherein the at least one rule for selecting a musical passage and/or musical note when a user's energy usage meets or is below the expected use range comprises selecting a musical audio passage in a musical style the user likes.

11. The method of claim 6, further comprising:
    using a first sound effect if the user's energy usage exceeded the expected use range for the second time period;
    using a second sound effect if the user's energy usage was within the expected use range for the second time period;
    using a third sound effect if the user's energy usage was below the expected use range for the second time period.

12. The method of claim 1, further comprising:
    creating a visual animation that is synchronized to the musical audio files;
    combining the visual animation with the piece of music;
    presenting the visual animation and the piece of music to the user.

* * * * *